United States Patent [19]

Shinohara

[11] Patent Number: 5,760,138
[45] Date of Patent: Jun. 2, 1998

[54] POLYACETAL RESIN COMPOSITIONS

[75] Inventor: Kenichi Shinohara, Yokohama, Japan

[73] Assignee: E. I. du Pont de Nemours and Company, Wilmington, Del.

[21] Appl. No.: 732,243

[22] PCT Filed: Apr. 28, 1995

[86] PCT No.: PCT/US95/05296

§ 371 Date: Oct. 25, 1996

§ 102(e) Date: Oct. 25, 1996

[87] PCT Pub. No.: WO95/29957

PCT Pub. Date: Nov. 9, 1995

[30] Foreign Application Priority Data

Apr. 28, 1994 [JP] Japan ................... 6-111711

[51] Int. Cl.⁶ .................... C08L 59/02; C08L 59/04
[52] U.S. Cl. .................... 525/155; 525/154; 525/398; 525/401; 525/523; 525/529
[58] Field of Search .................... 525/155, 154, 525/398, 401, 523

[56] References Cited

U.S. PATENT DOCUMENTS

| | | | |
|---|---|---|---|
| 4,098,843 | 7/1978 | Johnson | 260/857 F |
| 4,845,161 | 7/1989 | Richardson | 525/399 |
| 5,418,286 | 5/1995 | Takahashi et al. | 525/64 |
| 5,523,341 | 6/1996 | Kobayashi et al. | 524/99 |

FOREIGN PATENT DOCUMENTS

WO 92/20745  11/1992  WIPO.
WO 93/05107   3/1993  WIPO.

*Primary Examiner*—Fred Zitomer

[57] ABSTRACT

Polyacetal resin compositions characterized in that they are polyacetal resin compositions essentially consisting of a polyacetal resin, an olefin polymer containing a glycidyl group on the side chain and a styrene polymer having an oxazolyl group, the total content of the said olefin polymer having a glycidyl group on the side chain and the said styrene polymer having an oxazolyl group is 0.1–15 weight % with respect to the said polyacetal resin composition, and the content of the said styrene polymer having an oxazolyl group is 50–200 weight parts with respect to 100 weight parts of the said olefin polymer containing a glycidyl group on the side chain.

1 Claim, 3 Drawing Sheets

POLYACETAL RESIN COMPOSITIONS

BACKGROUND OF THE INVENTION

1. Field of the Invention

This invention is related to polyacetal resin compositions, and, in more detail, to polyacetal resin compositions having improved heat aging resistance and creep resistance and which present no problems of deterioration of physical properties at the welded portion.

2. Description of the Related Art

Since polyacetal resins have superior fatigue properties, friction and abrasion resistances and superior balance of mechanical properties among plastic materials, they are widely used as automobile, electric motor and electronic parts.

However, the polyacetal resins present the problem that if they are repeatedly used at high temperatures of 90°–120° C. for a long time, generally they are easily acid aged, their superior mechanical properties cannot be maintained and are found to be sharply worsened.

Therefore, it is necessary to improve their heat aging resistance (long-time thermal stability) in order to use the polyacetal resins at high temperatures for a long time, and various improvements have been attempted so far for this purpose. For example, methods of adding polyamides, antioxidants, such as polycarbodiimide and heat stabilizers to the polyacetal resins are described in U.S. Pat. No. 4,098,843 and U.S. Pat. No. 4,845,161.

As the polyacetal resins with improved heat aging resistance and creep resistance (long-time oil resistance), moreover, polyacetal resin compositions consisting of polyacetal resins and compounds having at least one functional group selected from the epoxy group, nitrile group and oxazolyl group have been known (TK Heisei3(1991)-118909).

SUMMARY OF THE INVENTION

Problems to be Solved by the Invention

However, the deterioration of physical properties, such as heat aging resistance, etc., of the portions where injected or extruded resins from feed entrances or feeding gates of different resins are merged inside a mold, i.e. the welding portions, has still not been sufficiently improved.

This invention aims at providing polyacetal resin compositions having improved heat aging resistance and creep resistance and no problems with deterioration of physical properties at the welding portions.

The purpose of the invention is to provide polyacetal resin compositions having improved heat aging resistance and creep resistance and no problem with deterioration of the physical properties at the welded portion.

Polyacetal resin compositions characterized in that they are polyacetal resin compositions essentially consisting of a polyacetal resin, an olefin polymer containing a glycidyl group on the side chain and a styrene polymer having an oxazolyl group, the total content of the said olefin polymer having a glycidyl group on the side chain and the said styrene polymer having an oxazolyl group is 0.1–15 weight % with respect to the said polyacetal resin composition, and the content of the said styrene polymer having an oxazolyl group is 50–200 weight parts with respect to 100 weight parts of the said olefin polymer containing a glycidyl group on the side chain.

DETAILED DESCRIPTION

Means of Solving the Problems

Figure 1:
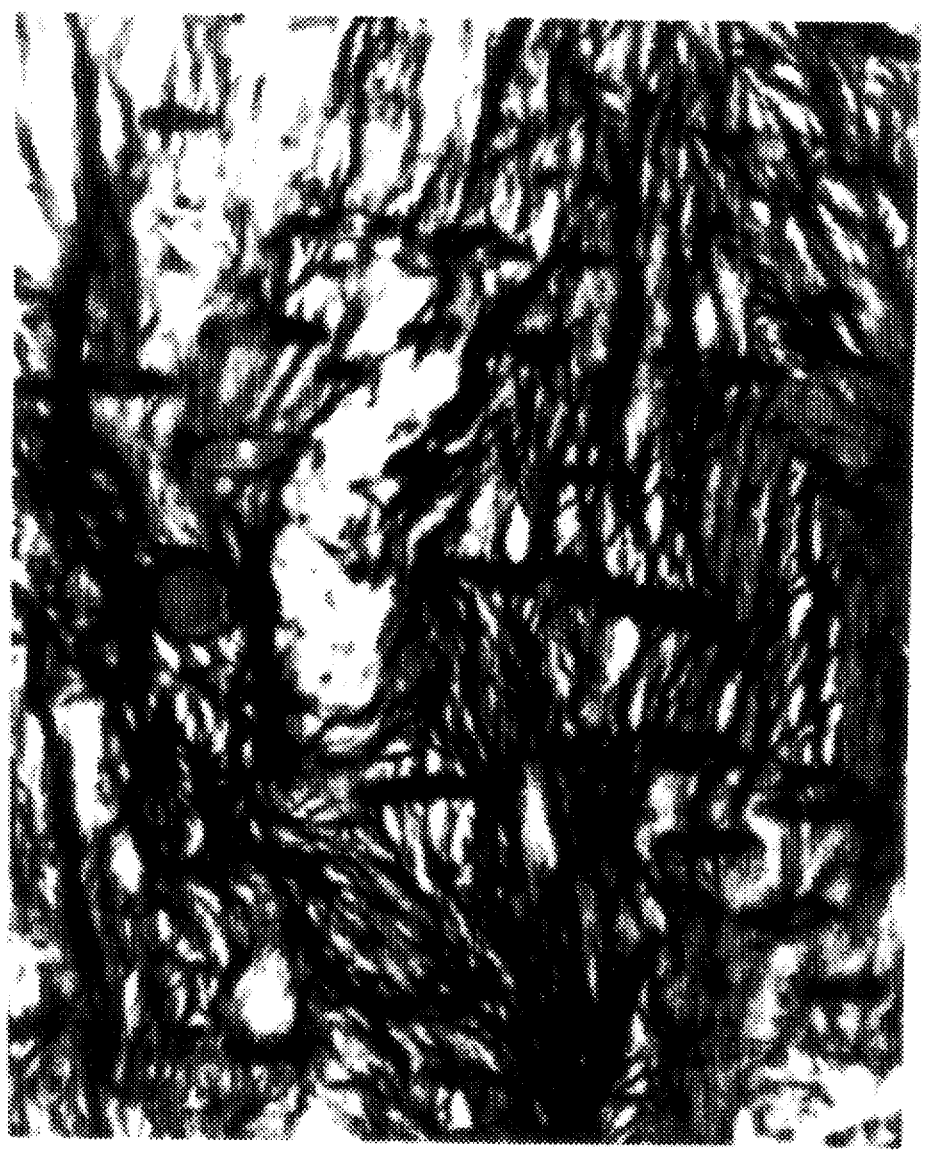
FIG. 1 is a transmission electron micrograph of a test piece II of Example 1.

As a result of earnest studies to solve the problems described above, the inventors achieved this invention by discovering that polyacetal resin compositions having improved heat aging resistance and creep resistance and no problems with deterioration of physical properties at the welding portions were obtained by compounding given amounts of an olefin polymer containing a glycidyl group on the side chain and a styrene polymer having an oxazolyl group with a polyacetal resin.

That is, this invention is related to polyacetal resin compositions characterized by the fact that they are polyacetal resin compositions, essentially consisting of an olefin polymer having a glycidyl group on the side chain and a styrene polymer having an oxazolyl group, the total content of the olefin polymer having a glycidyl group on the side chain and the styrene polymer having an oxazolyl group is 0.1–15 weight % with respect to the polyacetal resin composition, and the content of the styrene polymer having an oxazolyl group is 50–200 weight parts with respect to 100 weight parts of the olefin polymer containing a glycidyl group on the side chain.

The polyacetal resins used in this invention are polyacetal resins commonly known so far and are polymers obtained by polymerizing or copolymerizing aldehydes, such as formaldehyde, trioxane and tetraoxane that are cyclic oligomers of formaldehyde, etc., or polymers obtained by copolymerizing cyclic ethers or cyclic acetals such as ethylene oxide, propylene oxide, 1,3-dioxolane, etc., with these aldehydes. These polyacetal resins are linear polymers whose main chains consist of $-(CH_2O)_n$ units (n is a natural number) and/or $-(CHR-O)_n-$ units (R is alkyl, n is a natural number), are either not protected at the end groups, or protected by such groups as $-OCOCH_3$, $-OCH_3$, $-OCH_2$, $-OH$, etc., and the number-average molecular weight is 10,000–100,000, preferably 20,000–70,000.

The olefin polymers containing a glycidyl group on the side chain in this invention, can be, for example, a random copolymer of ethylene-glycidyl methacrylate, a three-component random copolymer of ethylene-methyl acrylate-glycidyl methacrylate, a three-component random copolymer of ethylene-butyl acrylate-glycidyl methacrylate, a three-component random copolymer of ethylene-vinyl acetate-glycidyl methacrylate, etc., but they are not restricted to these.

The styrene polymers having an oxazolyl group in this invention are, for example, a random copolymer of 2-vinyl-2-oxazoline and styrene, etc., and can be obtained by well-known radical copolymerization methods.

The total content of olefin polymers containing a glycidyl group on the side chain and styrene polymers having an oxazolyl group with respect to polyacetal resin compositions is 0.1–15 weight %, preferably 1–10 weight %. The improvements in heat aging resistance and creep resistance are not sufficient if the content is less than 0.1 weight %. On the other hand, the high strength and high resilience, being the original properties of polyacetal resins, are affected adversely if it is more than 15 weight %.

Figure 3:
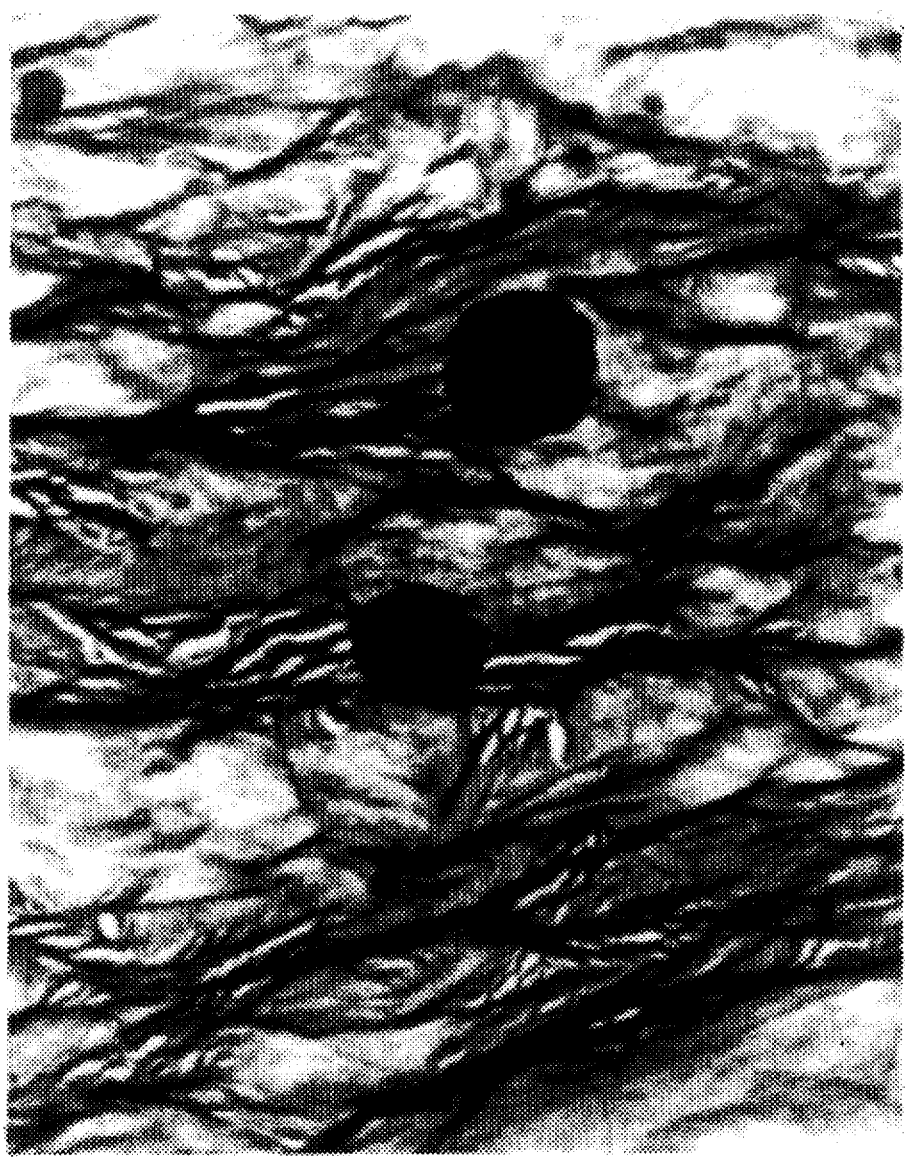
FIG. 3 is a transmission electron micrograph of a test piece III of Example 4.

If an olefin polymer containing a glycidyl group on the side chain and a styrene polymer having an oxazolyl group are melt-blended, as shown in FIG. 3, a phase separation structure is developed in which the olefin polymer containing a glycidyl group on the side chain results in a sea structure and the styrene polymer having an oxazolyl group results in an island structure because the volume ratio of the olefin polymer containing a glycidyl group on the side chain is greater than the volume ratio of the styrene polymer having an oxazolyl group. However, if a polyacetal resin, an olefin polymer having a glycidyl group on the side chain and a styrene polymer having an oxazolyl group are melt-blended and the three components are sufficiently contacted in the molten state, as shown in FIG. 1, the polyacetal resin results in a sea structure, and the styrene polymer having an oxazolyl group which has better miscibility with the polyacetal resin takes in the olefin polymer containing a glycidyl group on the side chain, which results in a core shell structure, a thermally stable structure.

Figure 2:
FIG. 2 is a transmission electron micrograph of a test piece II of Example 4.

The content of the styrene polymers having an oxazolyl group is 50–200 weight parts with respect to 100 weight parts of the olefin polymers containing an oxazolyl group. As shown in FIG. 2, if the content of the styrene polymers having an oxazolyl group is more than 200 weight parts, particles of the olefin polymers containing a glycidyl group on the side chain are not taken in by the styrene polymers having an oxazolyl group and being present individually in the polyacetal resins, and the welding strength is significantly reduced by the olefin polymers containing a glycidyl group on the side chain present individually in the polyacetal resins. Moreover, the nonuniformity of dispersion is also a reason why cracks occur. One the other hand, if the content is less than 50 weight parts, the heat stabilizing effect due to the styrene polymers having an oxazolyl group and the heat-stabilizing effect due to the olefin polymers having a glycidyl group on the side chain are not displayed in a coordinated manner, and the heat aging resistance cannot be sufficiently improved. Moreover, it is desirable to add the olefin polymers containing a glycidyl group on the side chain and the styrene polymers having an oxazolyl group at the same time.

Other polyacetal resin compositions in this invention can be obtained by adding antioxidants, heat stabilizers, formaldehyde absorbents, ultraviolet light absorbers, coloring pigments, molding agents, lubricants, etc., in the range where the properties of the polyacetal resins are not harmed.

Moreover, this invention is also related to molded products obtained by molding polyacetal resin compositions which are polyacetal resin compositions, essentially consisting of a polyacetal resin, an olefin polymer containing a glycidyl group on the side chain and a styrene polymer having an oxazolyl group. In these compositions, the total content of the olefin polymer having a glycidyl group on the side chain and the styrene polymer having an oxazolyl group is 0.1–15 weight %, and the content of the styrene polymer having an oxazolyl group is 50–200 weight parts with respect to 100 weight parts of the olefin polymer having a glycidyl group on the side chain.

The molded products of this invention can be obtained by well-known molding methods from the polyacetal resin compositions described above. Common methods for molding thermoplastic resins such as the injection molding method, melt-extrusion molding, compression molding, flow-extension molding, etc., are included in these molding methods.

Furthermore, this invention consists of a method of manufacturing polyacetal resin compositions characterized by the fact that mixtures obtained by melt-blending 100 weight parts of an olefin polymer containing a glycidyl group on the side and 50– 200 weight parts of a styrene polymer having an oxazolyl group are melt-blended by compounding them with a polyacetal resin in quantities of 0.1–15 weight % of the total resin composition.

The polyacetal resin compositions can be obtained by well-known methods, e.g., after the ingredients are fully mixed and melt-blended with a monoaxial or biaxial screw extrusion molding machine, to give pellets. However, in order that the olefin polymer containing a glycidyl group on the side chain is taken in by the styrene polymer having an oxazolyl group to produce a core-shell structure with a higher probability, it is desirable to further improve the uniformity of dispersion of the olefin polymer containing a glycidyl group on the side chain in the styrene polymer having an oxazolyl group. As desirable methods of manufacturing the polyacetal resin compositions in this invention, therefore, a manufacturing method is given in which mixtures, e.g. a pellet-like mixture, obtained by melt-blending a styrene polymer having an oxazolyl group with an olefin polymer having a glycidyl group on the side chain, was melt-blended by compounding with a polyacetal resin.

EXAMPLES

This invention is explained in detail with the aid of the examples below.

A homopolymer-type polyacetal resin is used. As the olefin polymer having a glycidyl group on the side chain, ethylene-n-butyl acrylate/glycidyl methacrylate three-component random copolymer and ethylene-methyl acrylate/glycidyl methacrylate three-component random copolymer are used. As the styrene polymer having an oxazolyl group, styrene and 2-vinyl-2-oxazoline copolymer are used.

Examples 1–3 and Comparative Examples 1–9

The ingredients shown in Table 1 were melt-blended at a set barrel temperature of 200° C. with a 35 mm biaxial screw extrusion molding machine (Toshiba TEM 35), cooled with water and cut to make resin pellets.

The resulting resin pellets were used to make dumbbell-shaped pieces with an injection molding machine (Toshiba). Two kinds of dumbbell pieces are made, i.e. one type of test piece consisting of a gate in a position and no welded portion (test pieces I), and another type of test piece consisting of gates at both ends and welding produced in the central (test pieces II). The mold pressure of the injection molding machine was 150 tons, and the molding conditions a resin temperature of 205° C., metal mold temperature of 85° C. and injection pressure of 1000 kg/cm$^2$.

Examples 4–5

A-1 and B-1 were mixed in the quantities shown in Table 1 for 15 minutes with a tumbler mixer, and then melt-blended at a set barrel temperature of 190° C. with a 35 mm biaxial screw extrusion molding machine (Toshiba TEM 35), cooled and cut to make resin pellets.

The resulting resin pellets were used to make dumbbell pieces with an injection molding machine (Toshiba). The dumbbell pieces were made into a type of test pieces consisting of gates at both ends and a welding produced in the central portion of the test pieces (test pieces III). The mold pressure of the injection molding machine was 150 tons, and the molding conditions were a resin temperature of 205° C., metal mold temperature of 85° C. and injection pressure of 1000 kg/cm$^2$.

Moreover, the resulting resin pellets and the polyacetal resins shown in Table 1 were melt-blended at a set barrel temperature of 200° C. with a 35 mm biaxial screw extrusion molding machine (Toshiba TEM 35), cooled with water and cut to make resin pellets.

The resulting resin pellets were used to make dumbbell pieces with an injection molding machine (Toshiba). Two kinds of test pieces are made, i.e. one type of test piece consisting of a gate in a position and no welded portion (test pieces I) and another type of test piece consisting of gates at both ends and a weld produced in the central portion of test pieces (test pieces II). The mold pressure of the injection molding machine is 150 tons and the molding conditions were a resin temperature of 205° C., metal mold temperature of 85° C. and injection pressure of 1000 kg/cm².

Furthermore, the resins and additives used in Examples and Comparison Examples were as follows.

POM 1:

Polyacetal homopolymer with a melt index of 1.0 g/10 minutes (190° C., a load of 1060 g) (100PNC10 made by DuPont Co.).

POM 2:

Polyacetal homopolymer with a melt index of 6.3 g/10 minutes (190° C., a load of 1060 g) (500PNC10).

A-1:

Ethylene-n-butyl acrylate/glycidyl methacrylate three-component random copolymers with monomer contents of 30% butyl acrylate and 5% glycidyl methacrylate (made by DuPont Co.).

A-2:

Ethylene-methyl acrylate/glycidyl methacrylate three-component random copolymer with monomer contents of 30% methyl acrylate and 6% glycidyl methacrylate (Bondfast 7M made by Sumitomo Chemical Industries Co., Ltd.).

B-1:

A copolymer of styrene and 2-vinyl-2-oxazoline with a monomer content of 5% oxazoline (Epocross RPS-1005 made by Nippon Shokubai Co., Ltd.).

Evaluation of Splice Strength of the Welded Portion

The tensile yield strength of the obtained test pieces I and II are determined based on D638.

The splice strength of welding portions was obtained by the following equation. The results are shown in Table 1.

splice strength of welded portion=100×(tensile yield strength of test piece I)/(tensile yield strength of test piece II)

Evaluation of Heat-aging Resistance

The test pieces I were put in an air circulation oven heated to 125° C. and allowed to stand for 1800 h, then were withdrawn and the tensile yield strength was determined based on D638. The results are shown in Table 1.

The high-temperature heat resistance was obtained by the following equation. The results are shown in Table 1.

high-temperature heat resistance=100×(tensile yield strength after aging)/(initial tensile yield strength)

Transmission Microscope Observations of Welded Portion

Thin film samples were cut from the welding portions of test pieces II of Example 1 and Example 4 and test piece III from Example 4 with a microtome, and they were examined with a transmission electron microscope. An electron micrograph of test piece II of Example 1 is shown in FIG. 1, an electron micrograph of test piece II of Example 4 is shown in FIG. 2 and an electron micrograph of test piece III of Example 3 is shown in FIG. 3.

From FIG. 1, it can be seen found that almost all of A-1 was taken in by B-1 to form a core-shell structure. The average particle size was 0.6 micron (maximum particle size 6 microns) and the particles were dispersed in the polyacetal matrix resin. Moreover, individual particles of A-1, which were not taken in by B-1, were observed but their particle size was 0.25 micron (maximum particle size 0.51 micron), the resin was elongated and greatly deformed by shearing due to the flow of the molten resin.

From FIG. 2, it can be seen that all of A-1 is taken in by B-2 to form a core-shell structure. The average particle size was 0.86 micron (maximum particle size 3.0 microns) and the particles were dispersed in the polyacetal matrix resin.

From FIG. 3, it can be seen that a sea-island structure was formed where B-1 was dispersed in A-1. The average particle size of B-1 was 5.2 microns (maximum particle size 15.5 microns).

By comparing the compositions of Examples 1–5 with those of Comparative Examples, as shown in Table 1, it is obvious that they are superior in high-temperature heat resistance and their welded splice strength is improved. Moreover, if Example 1 and Example 4 are compared, it is found that the welded splice strength can be further improved by a method in which a styrene polymer having an oxazolyl group is previously melt-blended with an olefin polymer containing a glycidyl group on the side chain to make pellets, and then the polyacetal resin is melt-blended again with the resulting pellets, as in Example 4.

Effects of the Invention

Molded products having superior heat-aging resistance and creep resistance and no problems with deterioration of physical properties at the welding portions can be provided if they are molded by using the polyacetal resin compositions of this invention.

TABLE 1

|  | POM | A-1 | A-2 | B-1 | test pieces I (kg/cm²) | test pieces II (kg/cm²) | aging (kg/cm²) | welding (%) | heat resistance (%) |
|---|---|---|---|---|---|---|---|---|---|
| Example 1 | POM 1 | 1.2 | 0.0 | 0.8 | 652 | 582 | 681 | 89 | >98 |
| Example 2 | POM 1 | 0.0 | 1.0 | 0.5 | 680 | 578 | 705 | 85 | >98 |
| Example 3 | POM 2 | 3.0 | 0.0 | 2.0 | 680 | 858 | 671 | >95 | >98 |
| Example 4 | POM 1 | 1.2 | 0.0 | 0.8 | 670 | 665 | 692 | >95 | >98 |
| Example 5 | POM 2 | 3.0 | 0.0 | 2.0 | 672 | 645 | 695 | >95 | >98 |
| Comparative Example 1 | POM 1 | 2.0 | 0.0 | 0.0 | 651 | 432 | 574 | 66 | 88 |
| Comparative Example 2 | POM 1 | 0.0 | 0.0 | 2.0 | 658 | 245 | 702 | 37 | >98 |
| Comparative Example 3 | POM 1 | 0.0 | 3.0 | 0.0 | 637 | 322 | 656 | 51 | >98 |
| Comparative Example 4 | POM 2 | 5.0 | 0.0 | 0.0 | 620 | 148 | 375 | 24 | 60 |

TABLE 1-continued

|  | POM | A-1 | A-2 | B-1 | test pieces I (kg/cm$^2$) | test pieces II (kg/cm$^2$) | aging (kg/cm$^2$) | welding (%) | heat resistance (%) |
|---|---|---|---|---|---|---|---|---|---|
| Comparative Example 5 | POM 2 | 0.0 | 0.0 | 5.0 | 622 | 169 | 662 | 27 | >98 |
| Comparative Example 6 | POM 1 | 0.0 | 0.0 | 0.0 | 700 | 666 | 605 | >95 | 86 |
| Comparative Example 7 | POM 2 | 0.0 | 0.0 | 0.0 | 680 | 658 | 575 | >95 | 85 |
| Comparative Example 8 | POM 1 | 12.0 | 0.0 | 6.0 | 523 | 87 | 345 | 17 | 66 |
| Comparative Example 9 | POM 1 | 0.5 | 0.0 | 1.5 | 675 | 658 | 553 | >95 | 82 |

What is claimed is:

1. A two-step method of manufacturing polyacetal resin compositions comprising a first step of obtaining a mixture by melt-blending 100 weight parts of an olefin polymer having a glycidyl group on the side chain and 50–200 weight parts of a styrene polymer having an oxazolyl group to form an olefin polymer/styrene polymer core shell structure, and a second step of compounding the mixture with a polyacetal resin in quantities such that the mixture comprises 0.1–1.5 weight percent of the total resin composition.

* * * * *